(12) United States Patent
Gibbs et al.

(10) Patent No.: US 7,948,875 B2
(45) Date of Patent: May 24, 2011

(54) IP EXCHANGE QUALITY TESTING SYSTEM AND METHOD

(75) Inventors: Michael D. Gibbs, Herndon, VA (US); Gebran Krikor, Burtonsville, MD (US); Roger Kim, Ashburn, VA (US)

(73) Assignee: AIP Acquisition, LLC, Fort Lee, NY (US)

( * ) Notice: Subject to any disclaimer, the term of this patent is extended or adjusted under 35 U.S.C. 154(b) by 1431 days.

(21) Appl. No.: 11/042,597

(22) Filed: Jan. 24, 2005

(65) Prior Publication Data

US 2005/0128943 A1   Jun. 16, 2005

Related U.S. Application Data

(63) Continuation-in-part of application No. 10/671,315, filed on Sep. 25, 2003, now Pat. No. 7,236,575, which is a continuation-in-part of application No. 09/368,828, filed on Aug. 5, 1999, now Pat. No. 6,912,277, which is a continuation-in-part of application No. 09/213,703, filed on Dec. 17, 1998, now Pat. No. 6,144,727, which is a continuation-in-part of application No. 09/129,413, filed on Aug. 5, 1998, now Pat. No. 6,226,365, and a continuation-in-part of application No. 08/927,443, filed on Sep. 11, 1997, now Pat. No. 6,005,926, which is a continuation-in-part of application No. 08/920,567, filed on Aug. 29, 1997, now abandoned.

(60) Provisional application No. 60/538,320, filed on Jan. 22, 2004.

(51) Int. Cl.
*G01R 31/08* (2006.01)
*H04L 12/28* (2006.01)
*H04L 12/66* (2006.01)
*H04L 12/40* (2006.01)
*H04J 3/16* (2006.01)

(52) U.S. Cl. ........ 370/229; 370/241; 370/252; 370/254; 370/332; 370/351; 370/352; 370/401; 370/465

(58) Field of Classification Search .................. 370/248, 370/229, 230, 232, 238, 351, 352, 465, 332, 370/333, 241, 252, 254, 401
See application file for complete search history.

(56) References Cited

U.S. PATENT DOCUMENTS

| | | | | |
|---|---|---|---|---|
| 5,987,011 A | * | 11/1999 | Toh | 370/331 |
| 5,999,525 A | * | 12/1999 | Krishnaswamy et al. | 370/352 |
| 6,002,671 A | * | 12/1999 | Kahkoska et al. | 370/248 |
| 6,269,157 B1 | * | 7/2001 | Coyle | 379/114.01 |
| 2002/0069156 A1 | * | 6/2002 | Adam et al. | 705/37 |
| 2002/0165957 A1 | * | 11/2002 | Devoe et al. | 709/224 |
| 2003/0018769 A1 | * | 1/2003 | Foulger et al. | 709/223 |
| 2003/0101278 A1 | * | 5/2003 | Garcia-Luna-Aceves et al. | 709/240 |
| 2003/0128692 A1 | * | 7/2003 | Mitsumori et al. | 370/352 |
| 2003/0142682 A1 | * | 7/2003 | Bressoud et al. | 370/401 |
| 2003/0195968 A1 | * | 10/2003 | Selgas et al. | 709/228 |
| 2004/0136327 A1 | * | 7/2004 | Sitaraman et al. | 370/252 |
| 2009/0292821 A1 | * | 11/2009 | Grib et al. | 709/238 |

FOREIGN PATENT DOCUMENTS

DE   195 16 364   11/1995

OTHER PUBLICATIONS

Pankaj Gupta, Steven Lin, and Nick McKeown "Routing Lookups in Hardware at Memory Access Speeds" Computer Systems Laboratory, Stanford University.*

* cited by examiner

*Primary Examiner* — Daniel J Ryman
*Assistant Examiner* — John Blanton
(74) *Attorney, Agent, or Firm* — Cohen Pontani Lieberman & Pavane LLP

(57) ABSTRACT

A method for measuring a quality of an IP network of a member of a trading exchange includes finding a penultimate hop corresponding to each IP network IP network prefix in a set of IP network IP network prefixes of a member, determining a quality score for the each IP network IP network prefix based on tests performed at the penultimate hop, and creating a matrix for the member including the determined quality for the each IP network IP network prefix. The quality is used to facilitate matching the offers of the buyers and sellers.

26 Claims, 8 Drawing Sheets

MemberID,prefix,packetloss,latency,jitter,availability,bgpstability,date
1.1.1.1,198.37.37.0/24,0,40,10,1,0,200401201212
1.1.1.1,198.182.38.0/24,0,80,15, 1,13,200401201212
1.1.1.1,204.188.0.0/15,10,35,5,1,2,200401201212
1.1.1.2,204.188.0.0/15,30,55,25,1, 200401201212
1.1.1.2,205.216.0.0/14,0,102,10,1,1,200401201212
1.1.1.2,205.136.0.0/16,0,12,1,1,0,2004011201212

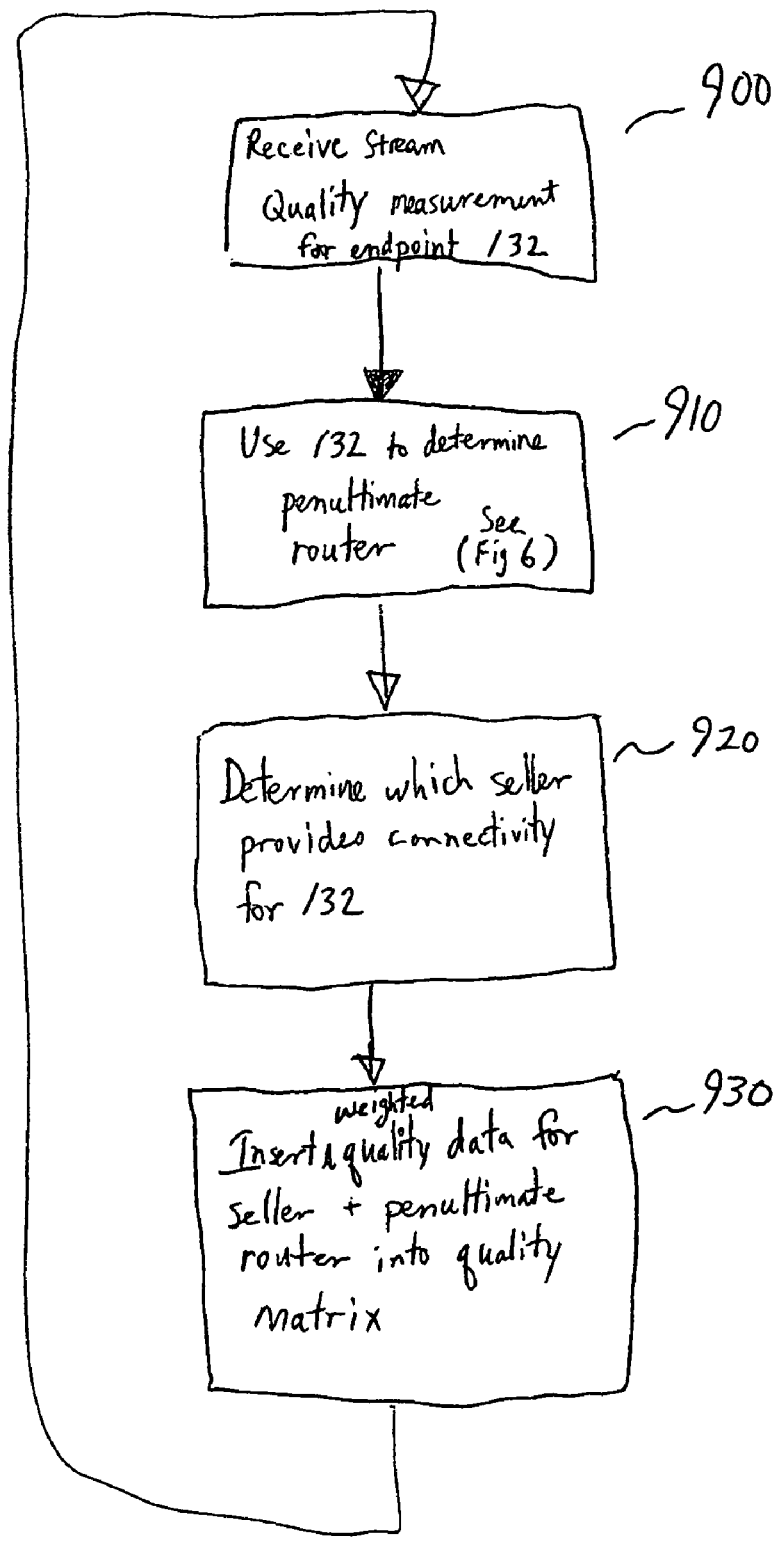

IP EXCHANGE QUALITY TESTING SYSTEM AND METHOD

CROSS REFERENCE TO RELATED APPLICATIONS

The present application claims priority to an earlier filed U.S. Provisional Patent Application No. 60/538,320, filed on Jan. 22, 2004.

The present application is also a Continuation-in-Part of U.S. patent application Ser. No. 10/671,315, filed on Sep. 25, 2003 now U.S. Pat. No. 7,236,575, which is a continuation-in-part of application Ser. No. 09/368,828, filed Aug. 5, 1999 now U.S. Pat. No. 6,912,277, which is a continuation-in-part of application Ser. No. 09/213,703 (now U.S. Pat. No. 6,144,727), filed Dec. 17, 1998, which is a continuation-in-part of application Ser. No. 09/129,413 (now U.S. Pat. No. 6,226,365) filed Aug. 5, 1998; and application Ser. No. 08/927,443, (now U.S. Pat. No. 6,005,926) filed Sep. 11, 1997, which is a continuation-in-part of U.S. patent application Ser. No. 08/920,567, filed Aug. 29, 1997 now abandoned, all of which are incorporated herein by reference.

BACKGROUND OF THE INVENTION

1. Field of the Invention

The present invention relates to testing the quality of IP routes. The present invention also relates to testing the quality of IP routes announced to an IP traffic exchange by a member of the IP exchange, the IP exchange allowing online trading of IP capacity.

2. Description of the Related Art

The Internet is a worldwide network of interconnected networks. Each individual host connected to the internet has an IP address. To send a data packet from one host to another, the data packet must be routed through the Internet. To accomplish this, each host includes a routing table which the host uses to determine which physical interface address to use for sending the data. When a host receives a data packet, the data packet is either intended for that host or intended for another host. When the latter occurs, the host retransmits the packet using its own route table. Route tables are based on static rules or dynamic rules via routing protocols. Accordingly, the quality of the route depends on the quality of each host that the packet passes through and the network elements that connect the hosts. It would be useful to know the quality level of each particular host along a route so that packets requiring a higher quality could be routed using hosts having a high quality.

Some individual quality indicators such as, for example, latency, availability, packet loss may be determined for certain routes on the Internet. However, the best route for one application may be the route with the best latency characteristics, while the best route for another application may require the best packet loss characteristic. Therefore, a comprehensive quality indicator for hosts or end points on the Internet is required which can be used for determining the best route for various different service types.

SUMMARY OF THE INVENTION

An object of the present invention is to provide a method and system for determining quality level of IP routes.

Another object of the present invention is to provide an anonymous spot trade platform in which members place buy and sell orders of IP capacity, and which allows a buying member to place a limit on how high or low they will go in quality level for the bid. These buy and sell orders disclose what the members wish to trade, and the price point at which they are willing to trade.

An IP traffic exchange according to the present invention allows sellers to offer for sale IP capacity in the form of routes within networks owned by the sellers (on-net routes), routes in networks that are not owned by the seller (off-net routes), or routes which includes both on-net and off-net portions. Buyers bid on the IP capacity based on the type of service they require. For example, buyers may bid on basic transit services, select route services, or optimized transit services. Basic transit service provides a connection to a single seller's or supplier's network for standard Internet access using best-effort routing method and is the basic access to the Internet typically offered by Tier 1 Internet Backbone Providers (IBP) and some Tier 2 Internet Service Providers (ISP). Buyers and sellers are matched for basic transit services based on price and quality.

Select routes service provides a customized connection to reach the routes of a specific Autonomous System Number (ASN) via a seller network or networks. The select routes service provides a customized routing for technically savvy buyers who know where their traffic is heading and who to connect with. The selected ASN may be owned by the seller itself, or by other sellers who advertise routes of that ASN. The latter is analogous to 'paid' private peering for specific ASNs, but with one connection to the exchange and without the need for an independent connection to each desired provider.

Optimized transit service provides a one-stop-shop connection for quality-optimized Internet access, and the most premium service of the three. Buyers of this service seek premium quality and are often price neutral/insensitive. The routing of each buyer's traffic routing is driven by an optimized routing application, which determines traffic distribution to participating sellers with optimized quality within certain pricing and quality parameters set by each buyer and managed by the exchange. The optimized routing table can be customized for each buyer to suit their unique combination of price and quality parameters.

Each host on the Internet has a 32 bit IP address. IP network prefixes are used to identify networks of hosts for which the beginning of the network address is the same. For example, 111.111.111.0/24 is an IP network prefix that refers to all hosts for which the first 24 bits of the IP address are 111.111.111. The present invention implements a quality measuring system grades each IP network prefix with some form of quality number which may comprise a 'tuple' of multiple quality parameters, with a formula to compute a qualitative single quality number. The quality measuring system performs a periodic quality measurement of all IP network prefixes announced by a seller member within a predetermined period, e.g., one hour.

The idea behind the inventive quality measuring system is to provide a quality score to each IP network prefix announced by a member, so that if a member announces 20,000 IP network prefixes to the exchange for trading, the system returns 20,000 quality scores for that member. This requires the quality measuring system to scan each IP network prefix for its quality. Since it will be unknown as to how this IP network prefix is assigned in a member or ISP's network, testing only one device in a member or ISPs network is insufficient. Instead, the system will need to break down the IP network prefix into its smallest assignments. Ideally, each individual 32 bit. IP address (also referred to as a host, endpoint, or /32) should be tested. However, the number of /32's you now must check for quality can be staggering, especially if the member you are currently testing sends the exchange a full routing table of 149 k IP network prefixes. The quality measuring system would then be testing 2 to 3 billion /32's, something that could take months, even with a large number of systems dedicated to the job. Add to that the fact that these measurements should be done every hour and the fact that a good portion of those /32's are cable or modem end points that are up and down far too frequently to allow a reliable quality measurement for the whole block. To solve this one would need to get buildings full of equipment just to test 20 to 30 members on one exchange. The costs for this are immense and commercially unreasonable. A method is required that reduces the amount of testing while still providing quality measurement with an acceptable margin of error.

On the public IPv4 Internet, the smallest public BGP routed block accepted by any major Internet Service Provider (ISP) is a /24 or larger block. The /24 is a network of 256 hosts or end points. The system according to the present invention will therefore ignore any route announcement of a block smaller than a /24. Instead of breaking down IP network prefixes into /32 s, the present invention determines the /24 s. The system is required to traceroute to each of the smallest publicly announced components. The present invention performs a traceroute to each network address/mask (each /24 in the present example). The network address of a /24 is the IP address that ends with 0.0 and is chosen because it is acceptable Internet traffic and does not set off firewall alarms or intrusion detection system (IDS) alarms. There is no real host at the network address and these packets for performing a traceroute cannot be classified as hacking attempts or intrusion probes. Tests to the actual ends points or hosts have a much higher probability of setting off alarms, because these types of tests are considered a precursor to uninvited network access or denial of service attacks. In addition, real world testing indicates that the device which responds to the network address has an extremely high correlation to the device which would be derived from testing the individual /32 s.

The inventors have also discovered that instead of testing each of the /24 s of the Internet directly, the penultimate hop or the last network device in a traceroute to an IP address may be tested to provide an adequate quality measurement of the /24. The penultimate hop directly precedes the /24 and is the network device that provides a gateway to the Internet for the /24 being tested. To determine the penultimate hop, the system needs to take in a full view of the Internet (complete routing table of all unique IP network prefixes announced into the Internet), in relation to the IP network prefixes announced. This can be achieved by receiving a view from a route-view on a public route server, or some private route server that contains all of the IP network prefixes announced publicly to the Internet for routing, or by having a private peering session with each member where their route announcements can be received and processed for further propagation.

After the network address is tracerouted, the penultimate hop for the traceroute should be recorded. As described above, the penultimate hop is the last network device that precedes the /24 being tested in the traceroute. This will typically be a router, which is the gateway for the connection of the /24 to the Internet. Once a list is created of all the penultimate hops for each network address/mask, the system will then quality test each of these penultimate hops and record the score, as well as what IP network prefixes are associated with each of the penultimate hops, into a database for future reference. This database can be updated aperiodically based on dynamic changes or growth of the entire Internet routing table. The quality testing of the penultimate hop is performed periodically (e.g., hourly) for each member, or aperiodically when a new seller is injected among sellers who qualify buyer's price and/or performance criteria.

Determining the penultimate router hop is one of the methods to determine the quality to the edge of the Internet. Another dynamic method, which may be used to complement the penultimate hop method, is to collect performance statistics from each end user having a video or audio internet streaming session open with streaming servers. These streaming servers are local to the exchange and belong to buyers who actively trade on the exchange. There are various standards (e.g., RTCP and modification to the popular Internet streaming protocols (RTSP, RTP, etc.) that can measure latency, packet loss, jitter, and other qualities. This performance information for each host (/32) is sent and gathered by the streaming servers in real-time as part of the streaming process. The quality system of the present invention collects this information in near real-time from the streaming servers, correlates the /32s and the routing data to find the parent network address/mask and penultimate hop, and compares the collected information to the results already existing for the penultimate hop. The system may then modify the quality score for each prefix before another periodic measurement is performed for the penultimate hop. The combination of the penultimate hop measurement and the collection of performance statistics provides a granular near real-time view of the performance of the Internet.

The backend system of matching and trading will use this data to give an overall quality snapshot for a member's buy order. Members buy ASN sets, and their trades are placed by asking for a specific ASN (and thus all of the IP network prefixes controlled by the ASN), as well as a price and a quality scale. The quality metric formula used may be different for different members. For example, some members may require a quality best suited for streaming media (low jitter) while others may require another quality best suited for large file transfers (low packet loss). The quality metric may be different for each buyer. In order to give that ASN a quality scale/score, etc. we will need to take all of the IP network prefixes within that ASN and use their scores for packet loss, latency, jitter, availability and Border Gateway Protocol (BGP) stability and get the average for that ASN. This is the ultimate use for this system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 9 is a flow diagram showing the steps for augmenting quality metrics with externally collected performance information.

DETAILED DESCRIPTION OF THE PRESENTLY PREFERRED EMBODIMENTS

Figure 1:
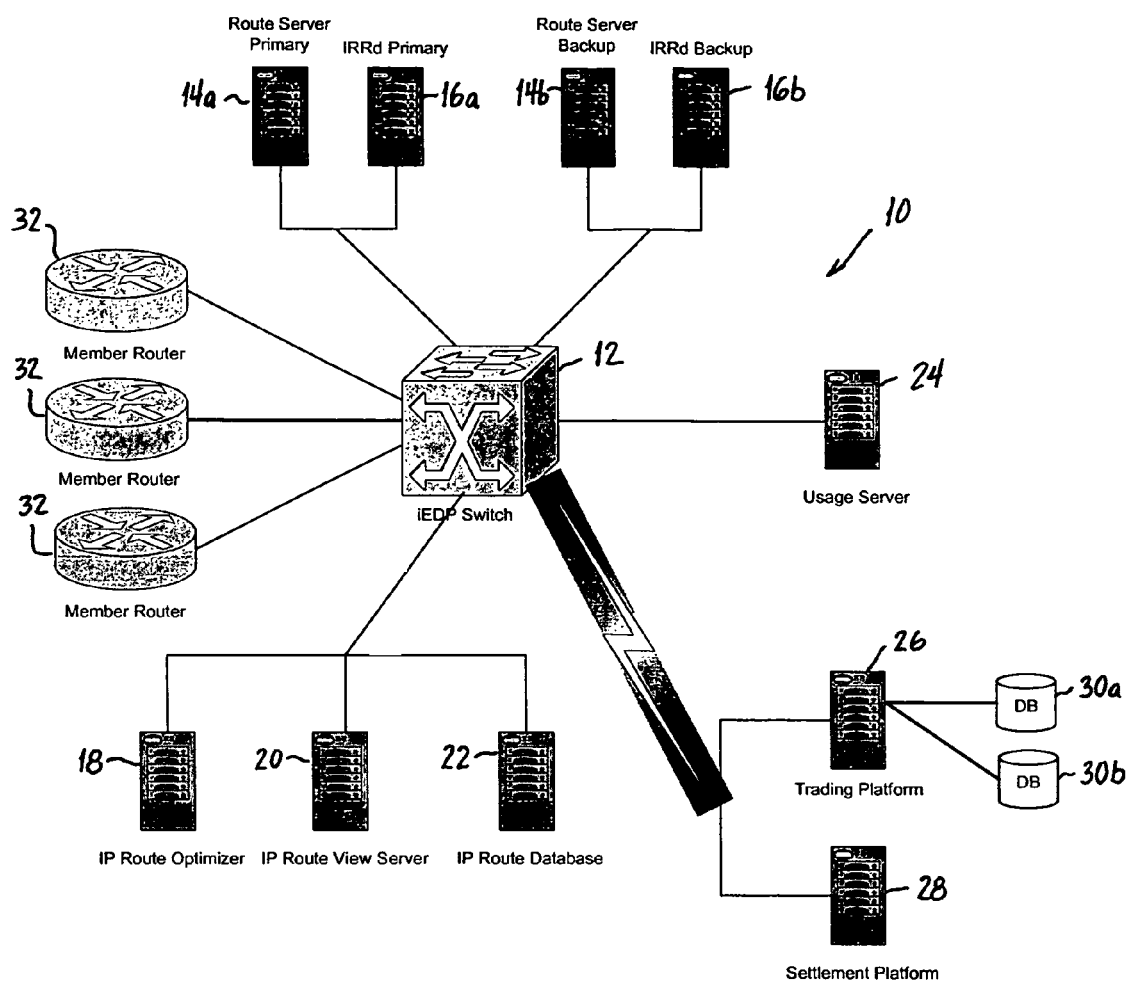
FIG. 1 is a schematic block diagram of the system in which the present invention is applied.

FIG. 1 depicts an IP Exchange System 10 according to the present invention including a IP Exchange Delivery Point (iEDP) switch 12 connected to a trading platform 26 for receiving buy and sell orders from members of the exchange and a settlement platform 28. The trading platform 26 is connected to a buy/sell order database 30*a* and a quality database 30*b*. Primary and secondary route servers 14*a*, 14*b* and primary and backup route registries 16*a*, 16*b* are also connected to the iEDP switch 12. An IP route optimizer 18, IP route view server 20, and IP route database 22 are also connected to the iEDP switch 12. The IP route optimizer 18, IP route view server 20, and IP route database 22 comprise part of a route analyzer discussed in more detail below and may comprise different portions of a single element or may comprise three separate elements as shown in FIG. 1. A usage server 24 is also connected to the iEDP switch 12 to monitor usage of the traded routes. Each member includes at least one member router 32 connected to the iEDP switch 12 through which IP capacity routes are announced for sale by seller, or through which bids are transmitted for IP capacity by buyers.

According to the invention, a quality analysis is performed to determine a quality score for connectivity to each IP network prefix announced for sale by a member, so that if a member announces 20,000 IP network prefixes to the exchange for trading, the system returns 20,000 quality scores for that member. This requires the quality measuring system to scan each IP network prefix for its quality. The inventors of the present invention have discovered that the penultimate hops, and not the end points of the Internet, may be tested to determine the quality level of an endpoint. To do this, the inventive system takes in a full view of the Internet (full routing table of all unique IP network prefixes announced into the Internet), in relation to the IP network prefixes announced to the exchange for trading. This can be achieved by receiving a view from a route-view on a public route server, or some private route server that contains all of the IP network prefixes announced publicly to the Internet for routing. Alternatively, a private peering session may be conducted with each member where their route announcements can be received and processed for further internal propagation. At this point the system will need to sort all of the IP network prefixes to find the smallest publicly announced components. Once done, the system performs a traceroute to each IP network prefix of the smallest publicly announced components and records the penultimate hop for that traceroute, step 201. Once a list is created of all the penultimate hops for each IP network prefix, the system will then quality test these devices, step 202. The score resulting from the quality test as well as what IP network prefixes are associated with that device are compiled into a member quality matrix database for future reference, step 203, and optimized routing tables are generated from the member quality matrix database, step 204. The optimized routing tables are updated in real-time as BGP announcements and withdrawals are received from the members, step 205. Steps 202-205 are repeated at predetermined time intervals, such as every hour, per member, step 206. Steps 201-206 may be performed by the IP route view server 20 of the route analyzer.

In order to reduce what is needed to be monitored for quality, the system will need to find the penultimate hop for each /24 (The /24 is the smallest publicly announced component of the public IPv4 Internet). This allows 2-3 billion testing points to be reduced to 100-400 k testing points. There are two ways to find these penultimate hops, once we have a full view of all IP network prefixes announced for the Internet. One would be to find the penultimate hops through each member, and another would be to use either a third party transit provider or another member that offers full transit. The reasoning for the first solution is that some end points may be multi-homed, and the system will miss different paths to those /24 s. This could make a /24 look worse if the only path that is taken is the one least preferred by that end ISP controlling the IP network prefix.

To do this makes for a more accurate quality measurement, but it also adds a large amount of complexity to the system. This would cause multiple penultimate hops for specific /24 s, and force the system to try and test both paths and figure out a fair way to combine the scores to give a useful quality score. In the preferred embodiment, one or more transit providers, who may be members or third parties, will be used to find the penultimate hop for each IP network prefix. This process should be done periodically (e.g., once a day).

Figure 3:
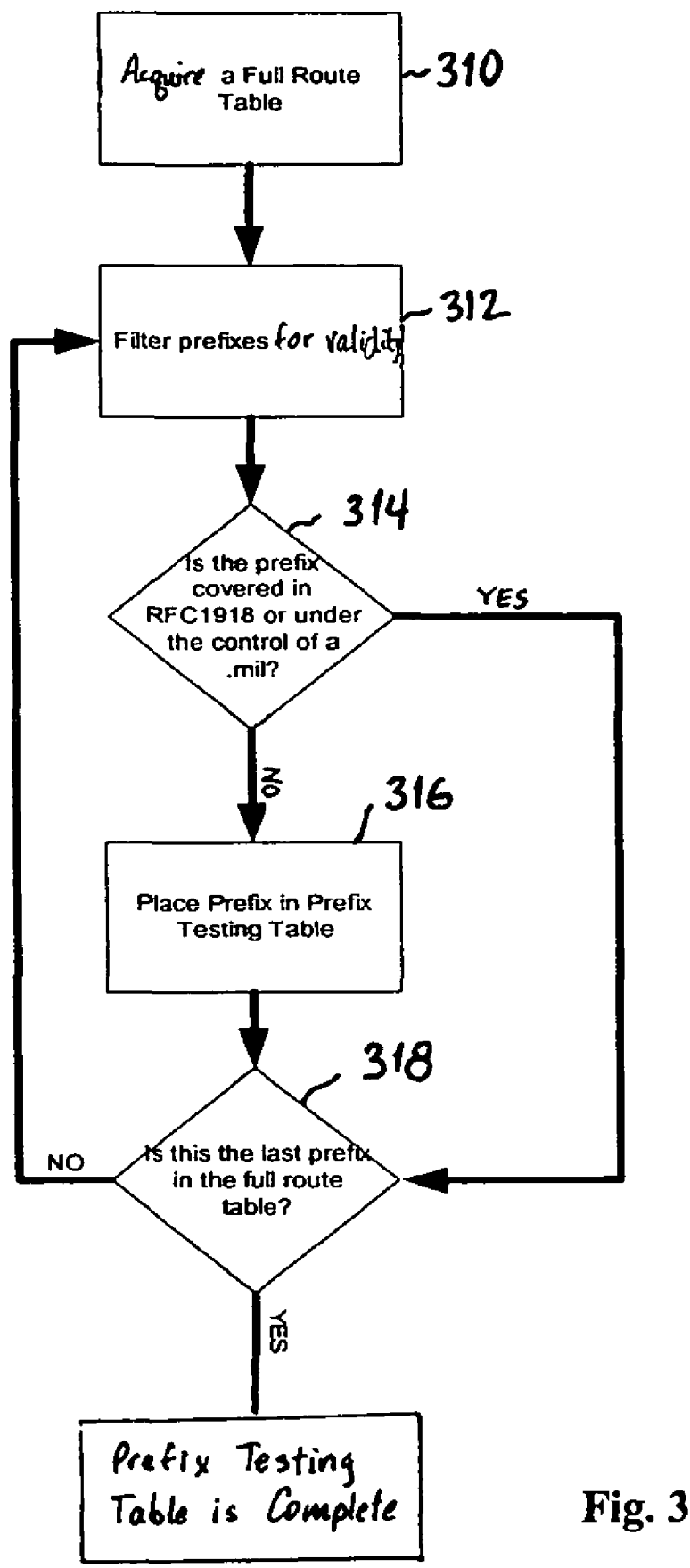
FIG. 3 is a flow diagram of the steps for determining useful IP network prefixes.

Initially, a full route table consisting of the union of the route tables from all (or a subset) of the members is retrieved and filtered to determine the useful IP network prefixes for testing. This process is shown in FIG. 3. First, the full route table is acquired, step 310. The IP network prefixes are then filtered for validity, step 312. Each valid IP network prefix is then checked to see if it is exempt as part of a private network under RFC 1918 or under control of a military (.mil) IP address allocation or found on a list of blocks to exclude, step 314. If it is not exempt, the IP network prefix is added to an IP network prefix testing table, step 316. Steps 312-316 are repeated for all IP network prefixes in the full route table, step 318. In step 320, the prefix testing table is complete, and the information can be represented in the following table format.

TABLE 1

Full Route Table Prefix List

| Member ID | Prefix/mask | AS Path |
|---|---|---|
| 1.1.1.1 | 10.0.0.0/8 | 701 18637 1 |

Figure 4:
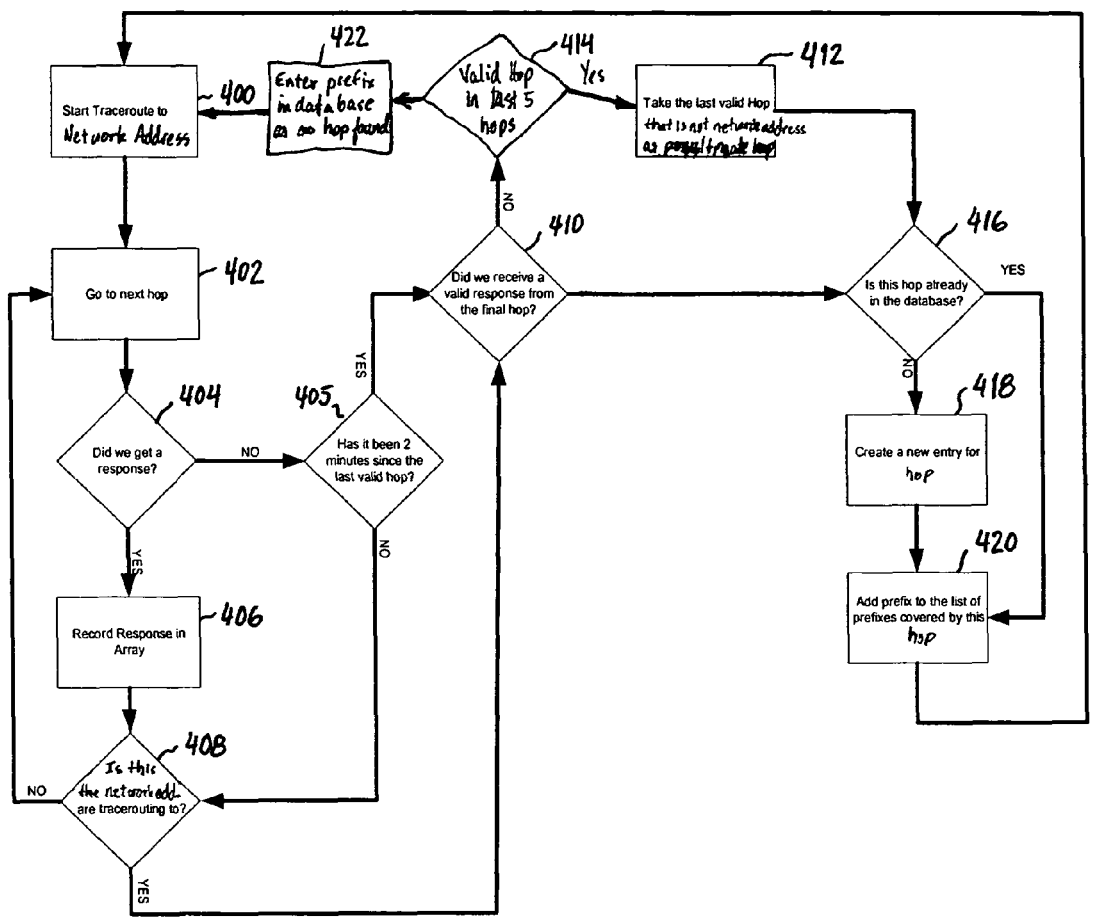
FIG. 4 is a flow diagram of the steps for finding the penultimate hop for each IP network prefix to be tested.

The process of finding the penultimate hop is shown in FIG. 4. Preferably, multiple penultimate hop detections are run simultaneously in parallel. To find the penultimate hop for each prefix/mask on the IP network prefix testing table, the process runs a traceroute to the network address of each prefix/mask, step 400. The network address of the prefix/mask is tested because this is considered acceptable Internet traffic and does not set off firewall alarms or intrusion detection alarms (IDS) alarms. Real-world testing has shown that the device which responds to the network address has a very high correlation to the device which would be derived from testing individual hosts (/32 s). This will find the path to the network of the prefix/mask via the supplier of transit, and give an IP Address of each hop as it encounters them, step 402. If some part of the path is filtered, doesn't allow traceroutes to access that router or further, or some part of the path is down, the traceroute will return with a failure to reach the next hop, step 404. After a failure to reach a next hop, a timer is started which times out after a predetermined time period, i.e., two minutes, step 405. If a response is received, the response is recorded in an array, step 406. The process then determines whether the last hop is the network address that is being tracerouted, step 408. If it is not, step 402 is repeated. If the last hop is the network address, the process determines whether a valid response was received from the final hop, step 410. If no valid response was received from the last hop in step 410, or if there is a valid hop in the last five hops, step 414, the last valid hop is taken as the penultimate hop, step 412. If there is no valid hop in the last five hops, the IP network prefix is entered into the database with an entry stating "no penultimate hop found", step 422. The process determines if the penultimate hop determined in step 412 or 414 is already in the database, step 416. If the penultimate hop is not already in the database, a new entry is made for this device, step 418. The prefix/mask of the IP network prefix being tracerouted is then added to the list of prefix/masks covered by this penultimate hop, step 420.

Once all of the IP network prefixes in the table have been used to find their penultimate hop, the system may consolidate each router's list of /24 s into the most efficient CIDR block to facilitate searching in later phases of the quality measurement system. Each entry is stored in a database in Table 2.

TABLE 2

Penultimate Hop Database Format

| Penultimate Hop | IP network prefixes under Penultimate Hop |
| --- | --- |
| 205.198.3.2 | {3.0.0.0/8, 204.157.0.0/16, 199.0.216.0/24} |

Figures 5, 8:
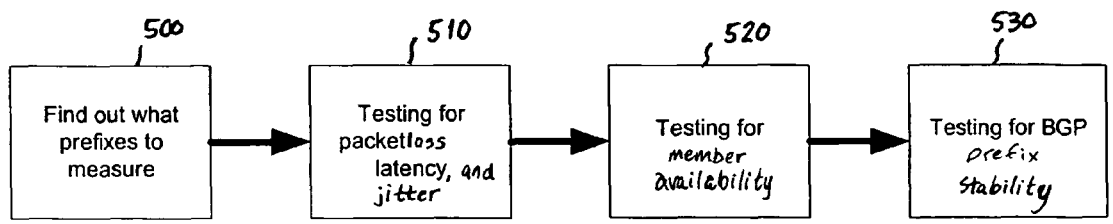
FIG. 5 is a flow diagram of the basic testing steps for each of the IP network prefixes.
FIG. 8 is a diagram showing the format of file for a member quality matrix.

FIG. 5 is a flow diagram showing the steps for testing the quality of the penultimate hops. The first step for testing the penultimate hops is to determine what IP network prefixes to measure, i.e., relevant to what endpoints are announced as for sale on the trading exchange, step 500. The quality measurements to be measured consist of network parameters such as, for example, packet loss, latency, jitter, member availability and BGP stability. This splits the measuring process into three parts. At step 510 the penultimate hop is tested for packet loss, latency, and jitter, at step 520 the penultimate hop is tested for availability, and at step 530 the penultimate hop is tested for BGP stability. The idea behind something other than just packet loss and latehcy is to get more granular and realistic information about on the actual or "real world" quality of that route. Jitter provides a metric for determining how stable the latency values are (high jitter can indicate queuing bottlenecks on the path). BGP stability is required to form a good understanding of what that announced IP capacity does. If the announced IP capacity is injected then recalled several times a day, there is a good chance the path the system hears that from is unstable. All of the above-described quality testing should be performed periodically (at least once per hour per member).

Figure 6:
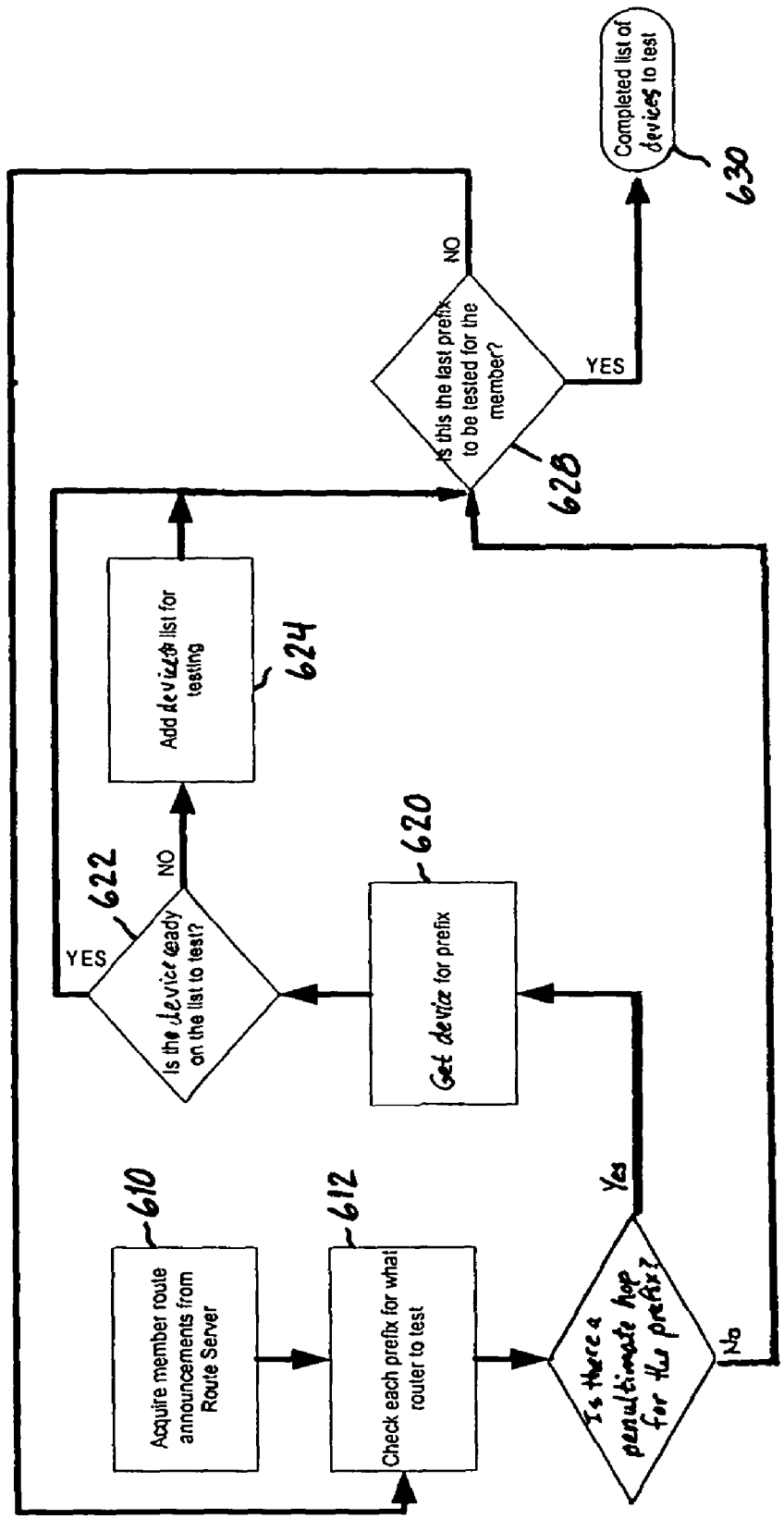
FIG. 6 is a flow diagram of the steps for determining which routers to test.

Even though we have a list of all the end routes in the Internet, we require quality information only for those endpoints that have been announced to the trading exchange, i.e., only the endpoints that are on sale. FIG. 6 is a flow diagram showing the steps for determining which routers to test. At step 610 the member route announcements are retrieved from the Route server 14 (see FIG. 1). Each IP network prefix in the member route announcements is checked to determine which penultimate hop to test, step 612. Since the IP network prefixes are stored in their most efficient CIDR block, step 614 determines if there is a penultimate hop listed for the IP network prefix. If not, the IP network prefix is skipped and the system goes to the next prefix, step 616. If the IP network prefix is listed under its current form under a penultimate hop, the penultimate hop is retrieved at step 620. The process determines whether the penultimate hop is already on the list of penultimate hops to test, step 622, and adds the penultimate hop to the list if it is not already there, step 624. Step 628 determines whether the last IP network prefix is tested. The completed list of penultimate hops is then sent to be tested in step 630.

Figure 7:
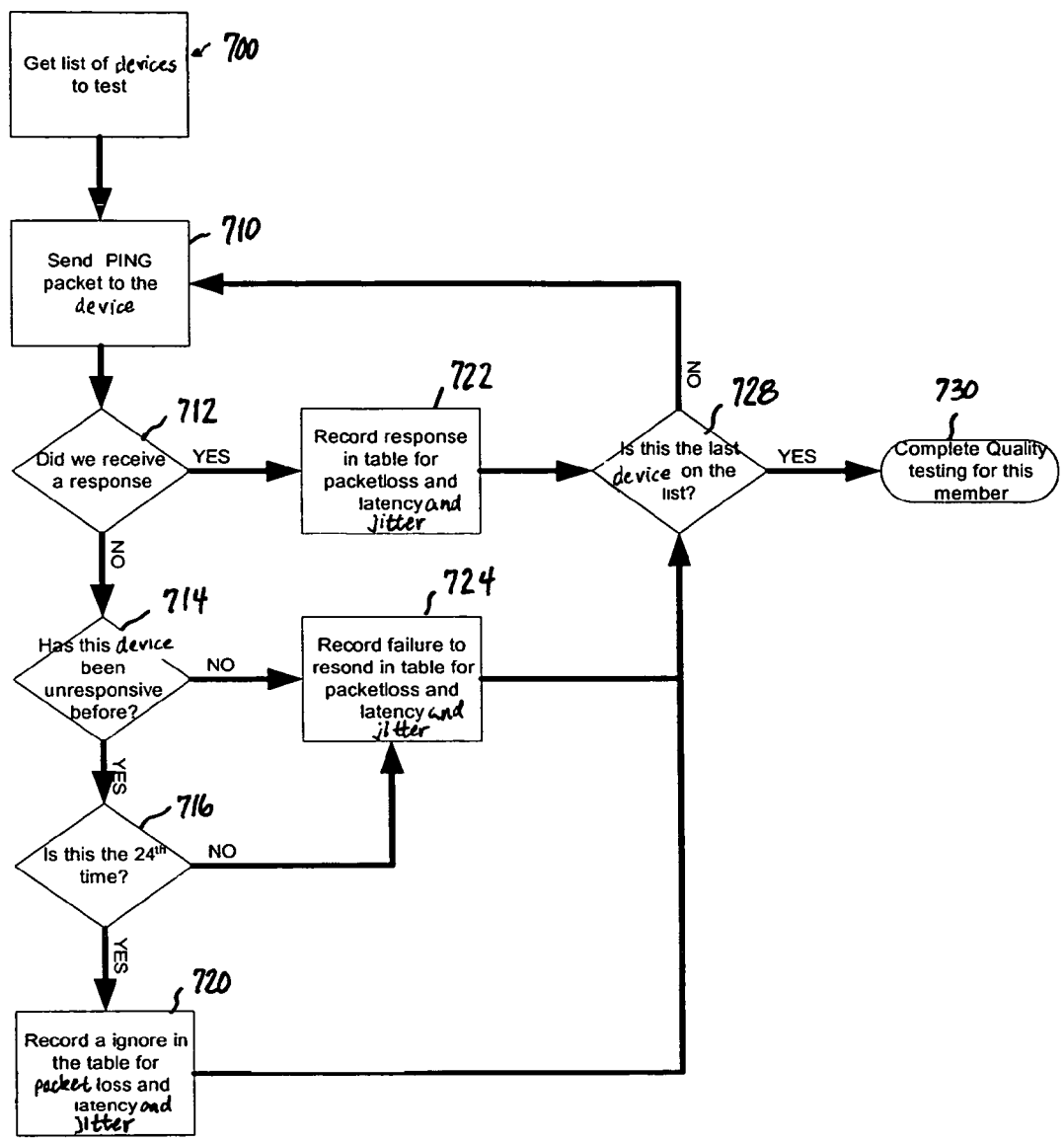
FIG. 7 is a flow diagram of the steps for packet loss and latency testing.

FIG. 7 shows the steps for testing packet loss, latency, and jitter. The system determines the list of penultimate hops to test, step 700, and sends an ICMP or UDP ping packet to each penultimate hop in the list for that member, step 710. As stated above, the testing is performed periodically, i.e., every hour, to allow visibility of the peaks and valleys in a member's traffic pattern. At step 712, the process determines whether a response is received. The problem with a ping test is that some devices will filter it out. Even if TCP is used instead of UDP or ICMP, the penultimate hop may still fail to issue a response. This causes some IP network prefixes to indicate a false 100% loss or null information (if that data is discarded). If this persists, then this penultimate hop and the IP network prefixes it represents will need to be taken out of the equation when computing packet loss for any ASN that is traded from this member. If no response is received, step 714 determines whether the penultimate hop device has been previously unresponsive. Step 716 determines whether it has been unresponsive for more than 24 times (i.e., 24 hours). If the penultimate hop device is unresponsive for 24 times or more, the device should be marked as an IGNORE in the Packet Loss, Latency, and Jitter columns in the table, step 720. If unresponsive for less than 24 times, the failure is recorded in the table, step 724. If a response was received in step 712, the responses are recorded in the table, step 722. If the penultimate hop is not the last penultimate hop in the list, a ping packet is sent to the next penultimate hop on the list, step 710. The ping packet of step 710 is sent several times (i.e., ten times) in quick succession to obtain more than a single snapshot view of the packet loss, latency, and jitter at that point in time. If the penultimate hop is the last penultimate hop on the list, the quality testing for the penultimate is completed as described below, step 730. Table 3 shows the format that may be used to store the response to the ping packet.

Packet loss is stored as a percentage. A "0%" indicates that there were no packets lost, and "100%" indicates that all of the packets were lost. Latency is the ms Round Trip Time (RTT) for the ping packet. Jitter is the difference between various measurements of latency, wherein a lower measurement indicates a more consistent latency.

TABLE 3

Member Packet loss and Latency format

| Member ID | End Router | Prefixes under End Router | Packet Loss | Latency (ms) | Jitter (ms) | Member Port Online | # of Times Announcements were cycled | Time Stamp |
|---|---|---|---|---|---|---|---|---|
| 1.1.1.1 | 205.198.3.2 | {3.0.0.0/8, 204.157.0.0/16, 199.0.216.0/24} | 0 | 40 | 5 | | | |

Testing availability of a router may be achieved relatively easily. All that needs to be done is to check the port on the IEDP switch 12 (see FIG. 1) via Simple Network Management Protocol (SNMP) to verify that the port is either up or down. The following is an example of a Management Information Base (MIB) required for this:

.1.3.6.1.4.1.1991.1.1.3.3.1.1.9.

Testing the availability of the router may be done as one large batch to get the current status of all members' ports and then add them to the quality table in the availability column. If the port is online, it may be designated as "1" in the database. If the port is down, it gets a "0" designation. Availability may also be derived from 100% packet loss for all pings to a member, as well as from accessing the port status by telnet or by other methods.

Testing is also performed for the stability of an IP network prefix. If the IP network prefix is injected and removed many times an hour, then there may be some issue with it, or there may be some strange policies associated with it. This modifies the quality of the ASN you are getting if parts of those controlled IP network prefixes are unstable. To determine stability of a route, a log of all the IP network prefixes that this member has injected and removed from the route server is acquired. This is done by parsing the log file specifically for this task that the Route Server exports and appends each time a BGP route change happens. The easiest way for this to be done would be to run the following script per IP network prefix:

cat <logfile>|grep <IP network prefix>|wc -l.

The results may be stored in the quality table in the BGP stability column.

FIG. 9 shows the steps for augmenting the quality measurements with complementary data received from external sources (for example, streamlining audio or video real-time quality information) and updating the packet loss, latency, and jitter. The system receives the additional quality information for a /32 endpoint IP address, step 900. The system then determines the IP network prefixes which contain the /32 and determines the penultimate router, step 910. It is then determined from the full route table which provider is providing the connectivity to the /32 end point IP address, step 920. The full route table is available to the quality server, allowing it to determine what route the streaming video server is using to reach the endpoint IP address. The new quality information is added to the available quality information for the endpoint, and used to update the quality information for the IP network prefix.

Figure 2:
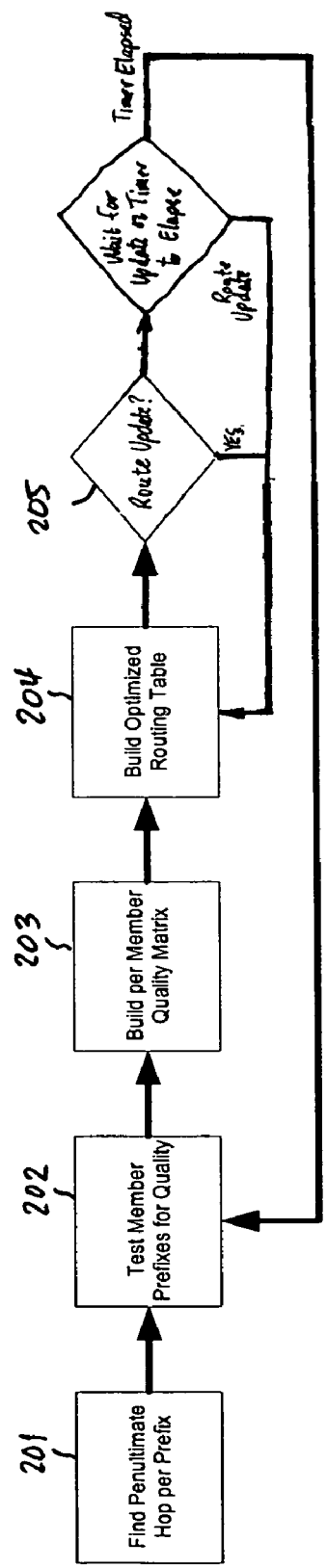
FIG. 2 is a flow diagram of the basic steps of the quality measurement method.

Once all of the testing for a router as shown in FIG. 2 is completed, a member quality matrix table should be constructed or updated that lists the entire set of IP network prefix scores for each member. This will be used by the matching engine of the trading platform 26 (see FIG. 1) to sort buy and sell trades by the quality of the ASN being traded. The member quality matrix table may be accessible from another machine within the LAN, but does not need to allow write permissions. The member quality matrix table may be output as a comma-delimited file that has all of a members IP network prefixes with the grades as exemplarily shown in FIG. 8. There would be a file for each member every hour. The file is downloadable by the matching engine of the trading platform for use and storage.

From the member quality matrix table, one or more optimized routing tables may be built. The idea is to take, for each buyer, a full route view and compare it with all of the routes that are announced by any member who wishes to participate and meets the buyer's price bids and other qualifications. For each IP network prefix in the full route table, the system chooses the best quality IP network prefix route from the available routes from qualifying members. This is performed by the IP route optimizer 18. It does this for each IP network prefix in the table, creating a new, optimized route table which is saved in the IP route database 22. This new optimized route table is transmitted to the Route Server for use by one or more members. The table is created for each member, according to their bid options. The formula used for the quality comparison can be customized to the traffic type of the customer (VoIP vs. bulk data).

The choice for quality by default follows this priority list, with ties going to the next step down:
1. Lowest score in packet loss,
2. Lowest score in latency,
3. Lowest score in jitter,
4. Highest score in availability 5. Highest score in BGP Stability,
6. Follow conventional BGP rules.

Other formulas are possible and can be modularly updated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for measuring a quality of an IP network, comprising the steps of:
   finding a network device that provides a gateway to the Internet for a /24 corresponding to each IP network prefix in a set of IP network prefixes of a member;
   determining a quality score for the each IP network prefix based solely on tests performed on the network device corresponding to the each IP network prefix; and
   creating a matrix including the determined quality score for the each IP network prefix, wherein said step of determining a quality score comprises at least one of:
   sending a packet to the network device to be tested for the member and determining at least one of packet loss, latency, and jitter, and
   determining an availability of the network device to be tested.

2. The method of claim 1, wherein said step of finding the network device comprises performing a traceroute to the network device corresponding to each IP network prefix, and recording the network device for that traceroute.

3. The method of claim 2, further comprising the step of generating a list of IP network prefixes covered by each of the network device.

4. The method of claim 3, further comprising the step of consolidating the list of IP network prefixes for each of the found network device into a CIDR block.

5. The method of claim 1, wherein the each IP network prefix denotes a network of endpoints or hosts whose IP addresses share the same IP network prefix.

6. The method of claim 1, wherein said steps of determining a quality, creating a matrix, and creating a routing table are repeated periodically.

7. The method of claim 1, wherein said steps of determining a quality, creating a matrix, and creating a routing table are repeated hourly.

8. The method of claim 1, wherein said step of finding the network device is performed periodically.

9. The method of claim 1, wherein said step of finding the network device is performed daily.

10. The method of claim 1, wherein the determined packet loss is recorded as one of lost and not lost.

11. The method of claim 1, wherein the determined latency is the round trip time of the packet.

12. The method of claim 1, wherein the determined jitter comprises a measurement of differences between measurements of latency.

13. The method of claim 1, wherein said step of determining a quality score further comprises determining a BGP stability of the network device to be tested.

14. The method of claim 13, wherein the matrix includes for the each IP network prefix to be tested, an entry including IP network prefix identification, the packet loss, the latency, the availability, the BGP stability, and a date and time of testing.

15. The method of claim 14, further comprising the step of creating an optimized routing table for the each IP network prefix in the full route table based on the following priority: lowest latency, lowest packet loss, highest availability, and highest BGP stability.

16. The method of claim 14, further comprising the steps of determining a stream quality measurement for an endpoint, determine the network device associated with the endpoint, and updating the matrix with weighted quality data for the network device based on the stream quality measurement.

17. A method for measuring a quality of an IP network, comprising the steps of:
   finding a network device that provides a gateway to the Internet for a /24 corresponding to each IP network prefix in a set of IP network prefixes of a member;
   determining a quality score for the each IP network prefix based solely on tests performed on the network device corresponding to the each IP network prefix; and
   creating a matrix including the determined quality score for the each IP network prefix,
   wherein said step of determining a quality score comprises at least one of:
   sending a packet to the network device to be tested for the member and
   determining at least one of packet loss, latency, and jitter, and
   determining an availability of the network device to be tested, acquiring a full route table and filtering the IP network prefixes in the full route table to obtain valid IP network prefixes, before said step of finding the network device, wherein the set of IP network prefixes includes only valid IP network prefixes announced by the member.

18. A route analyzer for determining an IP network prefix quality for each of a plurality of IP network prefixes, the route analyzer comprising:
   one or more physical servers configured for determining a network device that provides a gateway to the Internet for a /24 corresponding to each IF network prefix in the plurality of IP network prefixes, and determining a quality score for the each IP network prefix based solely on tests performed on the network device corresponding to each IP network prefix,
   wherein determining a quality score comprises at least one of:
   sending a packet to each the network device to be tested for a member and determining at least one of packet loss, latency, and jitter to said each of the network device, and
   determining an availability of each of the network device to be tested.

19. The route analyzer of claim 18, wherein said plurality of IP network prefixes comprises IP network prefixes offered to an IP bandwidth trading exchange for trading by a member of the IP bandwidth trading exchange.

20. The route analyzer of claim 19, wherein said route analyzer is further configured to create a matrix for the member that includes the quality score for the each IP network prefix.

21. The route analyzer of claim 18, wherein the network device of the each IP network prefix is a router in a traceroute for the each IP network prefix.

22. The route analyzer of claim 18, further comprising a route optimizer configured to create an optimized routing table by selecting a best quality IP network prefix route for the each IP network prefix.

23. The route analyzer of claim 22, further comprising an IP route database, the optimized routing table being stored in said IP route database.

24. An element in an IP bandwidth trading exchange including a non-transitory computer readable medium storing computer executable instructions for measuring a quality of IP network prefixes in an IF network of a member of the IP bandwidth trading exchange, said non-transitory computer readable medium comprising computer-executable instructions for executing the steps of:
   finding a network device that provides a gateway to the Internet for a /24 corresponding to each IP network prefix in a set of IP network prefixes of a member;

determining a quality score for the each IP network prefix based solely on tests performed on the network device corresponding to each IP network prefix; and creating a matrix for the member including the determined quality for the each IP network prefix, wherein said step of determining a quality score comprises at least one of:

sending a packet to each network device to be tested for the member and determining at least one of packet loss, latency, and jitter, and determining an availability of each network device to be tested.

25. A method for measuring a quality of an IP network, comprising the steps of:

finding a network device that provides a gateway to the Internet for a /24 corresponding to each IP network prefix in a set of IP network prefixes of a member;

determining a quality score for the each IP network prefix based solely on tests performed on the network device to each IP network prefix, comprising:

determining a BGP stability of each of the network device to be tested; and creating a matrix including the determined quality for the each IP network prefix.

26. A route analyzer for determining an IP network prefix quality for each of a plurality of IP network prefixes, the route analyzer comprising:

one or more physical servers configured for determining a network device corresponding to each IP network prefix in the plurality of IP network prefixes, and determining a quality score for the each IP network prefix based solely on tests performed on the network device that provides a gateway to the Internet for a /24 corresponding to each IP network prefix;

wherein determining a quality score comprises determining a BGP stability of the network device to be tested.

* * * * *